United States Patent [19]

Kaes

[11] 4,448,702

[45] May 15, 1984

[54] FREEZING-POINT-LOWERING COMPOSITION AND METHOD

[75] Inventor: Gertrude Kaes, Vienna, Austria

[73] Assignee: Lang & Co., Chemisch-Technische Produkte Kommanditgesellschaft, Vienna, Austria

[21] Appl. No.: 428,912

[22] Filed: Sep. 30, 1982

[30] Foreign Application Priority Data

Oct. 12, 1981 [AT] Austria .................................. 4378/81

[51] Int. Cl.³ .............................................. C09K 3/18
[52] U.S. Cl. ........................................ 252/70; 252/76; 252/79; 106/13; 562/590; 562/591; 562/592; 562/593; 562/594
[58] Field of Search ............... 252/70, 76, 79; 106/13; 562/590, 591, 592, 593, 594

[56] References Cited

U.S. PATENT DOCUMENTS 2,233,185  2/1941  Smith .................................... 252/76
2,971,023  2/1961  Hill ..................................... 562/593

*Primary Examiner*—John E. Kittle
*Assistant Examiner*—Robert A. Wax
*Attorney, Agent, or Firm*—Karl F. Ross; Herbert Dubno

[57] ABSTRACT

The freezing point of an aqueous system is lowered by adding to the system a freezing point lowering quantity of at least one and preferably two or more water soluble salts of dicarboxylic acids having at least three carbon atoms, specifically a dicarboxylic acid selected from the group which consists of adipic, glutaric, succinic and malonic acids, the salt being a sodium, potassium, ammonium or organoamine salt.

7 Claims, No Drawings

FREEZING-POINT-LOWERING COMPOSITION AND METHOD

FIELD OF THE INVENTION

My present invention relates to a freezing-point-lowering composition and method and, more particularly, to improvements in antifreeze and ice-melting compositions and especially such compositions which are not corrosive.

BACKGROUND OF THE INVENTION

Freezing point lowering compositions are in widespread use for a variety of purposes, especially to reduce the freezing point of an aqueous system so that ice cannot form or formed ice can be melted.

Freezing point lowering compositions depend for their effectiveness upon the molar freezing point lowering effect, the number of ionic species which are made available and the degree to which the composition can be dispersed in the liquid phase in which the formation of ice is to be precluded and/or ice is to be melted.

Perhaps the simplest ice-melting substance is common salt (sodium chloride) which has widespread applicability for the melting of ice on road surfaces or the like, the salt dissolving in an available liquid in contact with ice and thereby forming a solution with a lower freezing point than the ice itself so that the ice is melted.

Typical solutions of low freezing points include brines and ethylene glycol solutions, the latter having been used for many years as automobile cooling system antifreeze.

Brines are used to transfer heat at temperatures below the normal freezing point of water and the ethylene glycol solutions can be employed in heat transfer systems for automobiles and the like in regions in which the temperature may fall below the normal freezing point of water.

Thus it will be apparent that freezing point lowering compositions have widespread applicability, ranging from ice melting applications already mentioned, to heat transfer applications, and to applications in which it is vital to maintain a liquid in the unfrozen state, e.g. as in a fire extinguisher.

Such antifreezing and ice dissolving compounds are used for lowering the freezing point of aqueous solutions for the purpose of avoiding solid ice formations on the one hand, and for dissolving ice already formed on the other. So far have become known and widely used for such media inorganic salts like sodium chloride, magnesium chloride, calcium chloride, potassium phosphates, sodium phosphates, ammonium phosphates, ammonium nitrate, alkaline earth nitrates, magnesium nitrate, ammonium sulphate, alkali sulphates and organic compounds such as low-molecular alcohols, glycols, glycerine, lactates and urea.

Besides the freezing point lowering effect on water resulting from the use of those products, a question of particular significance is the corrosive action of the media on various materials as well as that of environmental protection.

It is well known that so far the most widely used and least expensive ice dissolving and antifreezing compounds have been sodium chloride and/or calcium or magnesium chloride. However, the chlorine contents of aqueous solutions of these salts cause heavy corrosion to iron and other metallic materials, concrete and brickwork as well as serious damages to plants.

It is also a known fact that chlorine present in such de-icing salts or salt solutions hampers the water absorption in roots of trees and low-grade plants. Chloride penetrates them into leaves, causing its harmful effect there. Leaves turn brown, starting from their edges, and will fall of prematurely. Under rain and melting snow, chlorides are washed out again from the fallen leaves, and the harmful chloride circulation begins again. Moreover, damage may result to the paws of domestic animals and human footgear and clothing. Also other known inorganic salts may contribute to environmental dangers as well as increase the corrosion risk to materials.

When using known organic ice dissolving and antifreezing compounds, the danger of corrosion may be averted more early as there are many organic compounds of non-aggresive effect on materials and by inclusion of inhibitors, they may be adjusted for corrosion prevention particularly with respect to metals.

Apart from economic aspects—more organic compounds are substantially more expensive than equal freezing point lowering compounds of inorganic nature—the problem of pollution control must be dealt with.

For example, the monoethylene glycol used frequently in motor vehicles as an antifreeze is particularly detrimental to sewage treatment processes.

Alcohols, methyl alcohol, may also have toxic effects and high volatility particularly in low molecular weight range and may be the cause of offensive smell and fire danger.

Furthermore, these substances produce no lasting bar to ice formation.

Because such mono- and polyhydric alcohols oxidize in the presence of atmospheric oxygen, acids may form, giving rise in turn to increased corrosion of materials. Therefore buffer substances like potassium phosphates or borax as well as metal corrosion inhibitors like benzo-, toltyl triazoles, phosphonates, alcanolic aminophosphates or molybdates are often added to those organic antifreezing compounds.

A typical example for such an ice dissolving and antifreezing compound is contained in Canadian Pat. No. 969 345. Such blends are also used for safety improvements on take-off and landing runways at airports and can include mixes composed of formamide, urea, water and chromate (Canadian Pat. No. 981 440).

But according to current knowledge neither formamide nor chromate should be used any longer for such purposes on account of their injurious and/or damaging effect to health and sewage water respectively.

According to German patent document No. 1 459 639 blends of formamide or formamide derivatives, water-soluble monohydric alcohols and glycolic ether are recommended for providing quick melting on surfaces covered with ice and snow.

In Czechoslovak patent 184 118 mixtures of ethanol with urea and inhibitors are described as liquid de-icing agents for airfields and streets. The problems encountered with organic products containing therein low-grade alcohols have been described already above.

Low-molecular monocarboxylic acids were already recommended as antifreezing compounds, i.e. the alkali salts of formic, acetic, propionic and butyric acids as per U.S. Pat. No. 2,233,185. Mixtures of urea with salt of low-saturated monocarboxylic acids, preferably of formic and acetic acids are described in Austrian Pat. No. 271 389. But these materials also have disadvantages.

Furthermore German patent document No. 2 933 318 describes the use of sodium/potassium chlorides in combinations with CaO, CaCO$_3$, MgO and/or MgCO$_3$. Here too, are contained harmful chlorides together with insoluble lime, dolomite.

Part of the patent literature deals with corrosion reduction of a de-icing salt (NaCl) by adding, for example, 0.1–10% lime nitrogen as per German Pat. No. 2 847 350 which, although able to reduce metal corrosion, does not avoid the harmful effects of NaCl on plants etc. The same applies to thawing salt (containing 80–99.9 weight % chlorides) that includes a corrosion inhibitor as per German patent document No. 2 161 522.

Due to the problems with chloride containing de-icing and antifreezing compounds as described above, efforts have been made since long to use other substances like ammonium sulphate, urea, sodium nitrate. Such blends, including various corrosion inhibitors are described in Austrain Pat. No. 191 383 as well as in U.S. Pat. No. 2,980,620.

As an antifreezing compound particularly suitable for fire fighting liquids, blends of urea, ammonium chloride, phosphate, sulphate are described in French Pat. No. 2 102 933. Also in U.S. Pat. No. 3,624,243 mixes of urea and ammonium nitrate with ethylic glycols are recommended as a de-icing liquid. However, all these compositions have disadvantages in use. It is known that urea as such becomes inoperative as a de-icing agent at tempertures of less than −8° C. (cryohydric point −11.5° C.).

Ammonium salts, however, that may produce lower ice dissolving temperatures attach concrete. Non-aggressive waters should have an NH$_4^+$ content of less than 15 mg per liter H$_2$O, a value which cannot be achieved in practice with the use of such salts as de-icing agents.

For non-aggressive waters the sulphate contents also should amount to less than 200 mg SO$_4^=$ per liter water in case of Portland cement, to less than 400 mg in case of blast furnace slag cement, and to less than 600 mg SO$_4^=$ for cement having an increased sulphate resistance (max. 3% tribasic calcium aluminate). When using water-soluble sulphates as de-icing agents these values can also not be met in practice. Ecologically, phosphates can be very damaging, and in many countries their amount contained in sewage is increasingly restricted.

The use of nitrates is not desirable both for reason of danger to sewage and dangerous state in dry condition, particularly in the presence of organic substances (explosion hazard).

From the foregoing it will be apparent that, while a large number of freezing-point-lowering systems have been developed heretofore and many of the problems attacked by the present invention have been recognized and treated with concern heretofore, a fully satisfactory freezing-point-lowering composition has not been developed because environmental hazards, explosion dangers, corrosion and the like have not fully been dealt with.

OBJECTS OF THE INVENTION

It is the principal object of the present invention to provide a freezing point lowering composition which is free from the disadvantages enumerated above and which can be efficiently utilized for ice melting or antifreezing purposes in practically all of the applications in which antifreezing and ice melting systems have been used heretofore.

Another object of this invention is to provide a composition for ice melting and antifreezing purposes which does not increase the difficulty of sewage treatment, which is harmless to plants, animals and humans and which is not corrosive to metals and building materials.

Still another object of the invention is to provide an antifreeze composition which, in an aqueous system, can prevent ice formation at temperatures as low as −20° C. without posing any hazard from toxicity or corrosion.

Yet a further object of my invention is to provide an improved method of preventing the freezing of water and/or of melting ice whereby various hazards of earlier systems are avoided.

DESCRIPTION OF THE INVENTION

These objects and others are attained, in accordance with the present invention, with an antifreezing and ice melting composition consisting of water soluble salts of a blend or mixture of dicarboxylic acids or a water soluble salt of dicarboxylic acid, containing not less than three carbon atoms. This composition may be used alone, i.e. directly, as a freezing point lowering agent by addition to water or application to ice, or can be used in an aqueous phase, i.e. as a concentrate, either as a nonfreezing solution or as an ice melting solution.

In addition, the composition can include solvents, other antifreezing and ice melting compounds or extenders, it being noted that the composition of the invention has such high anticorrosion properties as to enable its use with other ice dissolving compounds or antifreezing compounds which have hitherto been considered to be corrosive without particular danger.

According to the invention the dicarboxylic acid is selected from the group of adipic acid, glutaric acid, succinic acid and malonic acid, the preferred salts being salts or sodium, potassium, ammonium or organic amine salts.

Preferably, however, a combination of these dicarboxylic acids is used, i.e. two or more and preferably at least three of the dicarboxylic acids are found as respective salts in the composition which can contain small proportions of dicarboxylic acids with 8 to 10 carbon atoms. When additional freezing point lowering substances are used, these preferably are selected from the group which consists of urea, inorganic ammonium compounds and water soluble phosphates individually or together.

Blends of dicarbonic acids containing at least 3 carbon atoms can be obtained inexpensively from large manufacturing premises with a sufficiently high solubility in water in the form of alkali and ammonium salts.

They lower the freezing point of aqueous solutions to below −20° C., have corrosion protection properties, and offer in their weight category a favorable price comparison with organic monocarboxylic acids.

A great advantage of the dicarbonic acids and/or blends thereof is that their aqueous salt solutions are odorless (as opposed to formates, acetates, etc.), constituting anticorrosives for metals in given minimum concentrations.

Thus it has been established that a minimum concentration of 1.5 mol succinic acid (177 g/l) and/or 0.4 mol adipic acid (58 g/l) provide in form of their water-soluble salts good corrosion prevention for cast iron having a pH value of 7.5/7.8.

A further advantage of the dicarbonic acid blends as per this invention results from their low solubility in water with salts of polyvalent cations. For example, the relatively low-molecular calcium succinate has at $+10°$ C. a solubility of only 0.2 g/100 g H$_2$) which ensures a protective effect on concrete and other building materials against other corrosive components in the water.

SPECIFIC EXAMPLES

EXAMPLE 1

An antifreeze solution was made from an industrially obtained blend of dicarbonic acid, composed of 30–35 weight % adipic acid, 40–50 weight % glutaric acid and 20–25 weight % succinic acid. The contents of dicarbonic acids with 5 and 6 carbon atoms amounted to 75–80%, yet, the solubility of the blend as potassium salt was very good. 35.2 weight parts of this dicarbonic acid blend produced with 30 weight parts of KOH (caustic potash) and 34.8 weight parts of water a stable solution having a freezing and also a reliquefaction point of below $-20°$ C. Even when diluting this solution with additional 100 weight parts of water, still a freezing point of below $-10°$ C. was obtained.

The above solutions provided a very good corrosion prevention on metallic materials. They proved to be stable and their effect remained unchanged through atmospheric oxygen. Moreover, the solutions had a good buffer action against pH value alterations, and are thus an excellent antifreezing and de-icing compound of long service life. The solutions were suitable for the conduction of heat and cold (coolers, radiators, heat exchange for industry, trades, domestic uses) at temperatures ranging from $-20°$ C. to $+100°$ C.

EXAMPLE 2

A solution consisting of 30 weight parts of the dicarbonic acid blend as referred to in Example 1, 27.3 weight parts of caustic potash, 10 weight parts of urea and 32.7 weight parts of water also showed a freezing and reliquefaction point of below $-20°$ C. A solution containing additional 100 weight parts of water resulted in a freezing point of below $-14°$ C. (reliquefaction point at $-14°$ C.). The pH value of the solution amounted to 7.6, proving highly suitable both as a corrosion preventing heat conduction liquid with ageing stability analogously to Example 1, and a solvent of already formed ice. The non-poisonous condition of the solution was demonstrated by an LD$_{50}$ on rats and p.o. administration of about 5,000 mg dicarbonic acid blend/kg body weight. The dicarbonic acids respectively present in the blend are also used as foodstuff additives for other purposes.

EXAMPLE 3

An aqueous solution composed of 30 weight parts of urea, 15 weight parts of dicarbonic acid blend as per Example 1, 5 weight parts of 75% phosphoric acid, 16.9 weight parts of caustic potash, and 33.1 weight parts of water had a freezing point of below $-20°$ C. and upon dilution with 100 weight parts of water a freezing point of below $-11°$ C. The solution had excellent corrosion prevention properties both for ferrous and light metals and was found to be suitable as a de-icing agent at airports.

EXAMPLE 4

A solution made up of 30 weight parts of propylene glycol, 15 weight parts of dicarbonic acid blend as per Example 1, 5 weight parts of 75% phosphoric acid, 17.5 weight parts of caustic potash, and 32.5 weight parts of water resulted in a freezing point of below $-20°$ C., and upon dilution with 100 weight parts of water in a freezing point of below $-14°$ C. Application as per Examples 1 to 3.

EXAMPLE 5

Whereas in the preceding Examples the use of dicarbonic acid blends was described, in the present Example the potassium salt of pure succinic acid was examined in combination with urea as an antifreezing compound. The solution consisted of 25 weight parts of urea, 33.5 weight parts of potassium succinate, and 41.5 weight parts of water. The freezing point of this solution was found to be at $-13°$ C., with clean reliquefaction having been obtained at $+2°$ C. When diluted with 100 weight parts of water, the solution had its freezing point at $-10°/-11°$ C.

The use of the pure low-molecular potassium succinate showed, as referred to the blended dicarbonic acids, an effect of antifreezing and corrosion prevention that was not as favorable but still could be of advantage under given circumstances.

EXAMPLE 6

The solution specified in Example 2 was applied together with a solid matter blend composed of 40% urea and 60% ammonium sulphate from a spraying and spreading carriage to ice on concrete roads. With the joint use of both de-icing compounds at the rate of 20 g/sq. m. a thawing process was recorded already after 5 minutes on the roadway completely covered with ice having a thickness of 5 mm. After 10 minutes the ice coating was entirely dissolved permitting an absolutely normal full braking operation carried out on a test vehicle. With thicknesses amounting sporadically to 2 cm (track grooves) the road became sludgy upon doubling the amount applied (totally 40 g/sq.m.) already after 10 minutes, with ice cover removed after 20 minutes.

This field test not only revealed a very quick and lasting de-icing effect of the media used but also in spite of ammonium salts and water-soluble sulphates being used, showed that the surface of concrete roads was not attacked even over long contact periods. The reaction of ammonium salts with alkalic concrete components and of SO$_4^{2-}$ with Ca$^{2+}$ to gypsum was restrained by the dicarbonic acid blend in aqueous solution as a protective, virtually water-insoluble molecular surface film believed to be formed by insoluble dicarbonic acid salts of polyvalent cations and settling on the concrete.

EXAMPLE 7

The solution described in Example 2 was used for moist spreading in conjunction with solid urea in removing and keeping free from ice take-off and landing runways at airports. With the solution as per Example 2 de-icing was not only achieved and carried out at substantially lower temperatures over a shorter period than this would have been done with urea alone but also granulated or powdery urea being blown off was curbed by humidification with the solution. The aggressive effect of urea on light metal was considerably reduced by the content of solution as per Example 2.

EXAMPLE 8

The blend of dicarboxyl acids as referred to in Example 1 was turned into a concentration aqueous solution by means of ammonia. The solution was then used with success as an ice and snow melting agent for asphalted ways and squares.

EXAMPLE 9

A dried powdery potassium salt of the dicarbonic acid blend as Example 1 was mixed with solid urea and ammonium sulphate. The powder showed good shelf life and little tendency to lump, being therefore suitable to be used as a de-icing agent up to temperatures of $-24°$ C.

EXAMPLE 10

The dicarbonic acid blend as per Example 1 was turned into an aqueous solution with soda lye (NaOH). The solution is particularly suitable as an antifreezing compound for heat conduction installations. It is not recommended though as a de-icing agent in various fields since a sodium content in ice dissolvers may be harmful to plants, especially trees.

EXAMPLE 11

60 weight parts of a potassium salt obtained from dicarbonic acids, consisting of blend made up of 40% malonic acid, 30% succinic acid and 30% glutaric acid were turned into a solution with 40 weight parts of water. The freezing point of the solution was below $-20°$ C., and the solution presented a good de-icing and antifreezing effect.

In the Examples shown above, the addition of alkaline substances like caustic potash and/or ammonia to dicarbonic acid blends has been described. This converts the dicarbonic acid blends into the respective water-soluble salts. If neither dicarbonic acid nor lye are required to be present freely in the resulting salt solution, the corresponding stoichiometric proportions should be observed. In certain cases, it may also be of advantage to provide excessive amounts of one or another component so as to increase, for example, the corrosion prevention effect.

I claim:

1. A method of lowering the freezing point of an aqueous system which comprises the step of adding to said system a freezing point lowering quantity of at least one water soluble salt of at least one dicarboxylic acid having at least three carbon atoms.

2. The method defined in claim 1 wherein said dicarboxylic acid is selected from the group which consists of adipic, glutaric, succinic and malonic acids, the salt being a sodium, potassium, ammonium or organoamine salt.

3. The method defined in claim 2 wherein a freezing point lowering composition of a water soluble salt of a blend of at least three of said acids is added to said system.

4. In an antifreezing and ice melting composition, the improvement wherein an active antifreezing and ice melting component of said composition is at least one water soluble sodium, potassium, ammonium or organoamine salt of at least one dicarboxylic acid having at least three carbon atoms together with at least one further antifreezing and ice dissolving compound selected from the group which consists of urea, inorganic ammonium compounds, and water soluble phosphates.

5. The improvement defined in claim 4 wherein said active component consists of water soluble salts and a dicarboxylic acid blend of at least two dicarboxylic acids selected from the group which consists of adipic, glutaric, succinic and malonic acids.

6. The improvement defined in claim 5 wherein said blend is a mix of adipic acid, glutaric acid and succinic acid potassium salts.

7. The improvement defined in claim 5 wherein said blend is a mix of malonic acid, succinic acid and glutaric acid potassium salts.

* * * * *